United States Patent
Zhao et al.

(10) Patent No.: US 10,705,914 B2
(45) Date of Patent: Jul. 7, 2020

(54) GROUP-BASED CONTAINER CHECKPOINT GENERATION

(71) Applicant: EMC IP Holding Company LLC, Hopkinton, MA (US)

(72) Inventors: Junping Zhao, Beijing (CN); Xiangping Chen, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 164 days.

(21) Appl. No.: 15/991,669

(22) Filed: May 29, 2018

(65) Prior Publication Data
US 2019/0370113 A1    Dec. 5, 2019

(51) Int. Cl.
| | |
|---|---|
| G06F 11/00 | (2006.01) |
| G06F 11/14 | (2006.01) |
| G06F 11/07 | (2006.01) |
| G06F 9/54 | (2006.01) |
| G06F 9/455 | (2018.01) |

(52) U.S. Cl.
CPC ...... *G06F 11/1407* (2013.01); *G06F 9/45558* (2013.01); *G06F 9/544* (2013.01); *G06F 9/545* (2013.01); *G06F 11/0778* (2013.01); *G06F 11/1451* (2013.01); *G06F 11/1458* (2013.01); *G06F 2009/45583* (2013.01)

(58) Field of Classification Search
CPC ............. G06F 11/1407; G06F 11/1451; G06F 11/0778
See application file for complete search history.

(56) References Cited

U.S. PATENT DOCUMENTS

| | | | |
|---|---|---|---|
| 2015/0006487 A1* | 1/2015 | Yang | G06F 9/461 707/649 |
| 2015/0074058 A1* | 3/2015 | Zhao | G06F 11/1446 707/646 |
| 2018/0074748 A1* | 3/2018 | Makin | G06F 9/4856 |

OTHER PUBLICATIONS

"Memory Resource Controller," https://www.kernel.org/doc/Documentation/cgroup-v1/memory.txt, Apr. 2010, 14 pages.
(Continued)

*Primary Examiner* — Charles Ehne
(74) *Attorney, Agent, or Firm* — Ryan, Mason & Lewis, LLP

(57) ABSTRACT

An apparatus in one embodiment comprises a host device that includes at least one processor and an associated memory. The host device is configured to implement a plurality of containers each configured to access one or more portions of the memory. The containers are implemented as respective kernel control groups utilizing operating system level virtualization of the processor of the host device. The host device is further configured to assign the containers to groups in accordance with one or more designated criteria, and to generate checkpoints for respective groups of the containers. In conjunction with generation of a given one of the checkpoints for a particular one of the groups of containers, the host device identifies one or more pages of the memory that are shared by at least first and second containers of the particular group of containers, and generates the given checkpoint without duplicating the one or more shared pages to persistent storage.

20 Claims, 10 Drawing Sheets

(56) References Cited

OTHER PUBLICATIONS

Zhenyun Zhuang, "Don't Let Linux Control Groups Run Uncontrolled," https://engineering.linkedin.com/blog/2016/08/don_t-let-linux-control-groups-uncontrolled, Aug. 18, 2016, 8 pages.
Wikipedia, "cgroups," https://en.wikipedia.org/wiki/Cgroups, Mar. 12, 2018, 5 pages.
Wikipedia, "Kernel Same-Page Merging," https://en.wikipedia.org/wiki/Kernel_same-page_merging, Mar. 12, 2017, 2 pages.
Paul Hsieh, "Hash Functions," http://wwvv.azillionmonkeys.com/qed/hash.html, downloaded May 22, 2018, 5 pages.
Github.Com, "Docker Checkpoint & Restore," https://github.com/docker/cli/blob/master/experimental/checkpoint-restore.md, downloaded May 22, 2018, 2 pages.
criu.Org, "Docker," https://criu.org/Docker, Mar. 31, 2017, 5 pages.
criu.org, "Memory Changes Tracking," https://criu.org/Memory_changes_tracking, May 13, 2018, 3 pages.
N. Xia et al., "UKSM: Swift Memory Deduplication via Hierarchical and Adaptive Memory Region Distilling," 16th USENIX Conference on File and Storage Technologies, Feb. 12-15, 2018, pp. 325-339.
S. Kashyap et al., "Instant OS Updates via Userspace Checkpoint-and-Restart," USENIX Annual Technical Conference (USENIX ATC), Jun. 22-24, 2016, pp. 605-619.
Michael Holzheu, "CRIU: CRazI stUff for the Mainframe?" Open Source Summit, Sep. 11, 2017, 44 pages.
Wikipedia, "Ptrace," https://en.wikipedia.org/wiki/Ptrace, Mar. 9, 2020, 4 pages.

* cited by examiner

```
$ docker ps
CONTAINER ID    IMAGE                           COMMAND                  CREATED
4c01db0b339c    ubuntu:12.04                    bash                     17 seconds ago
d7886598dbe2    crosbymichael/redis:latest      /redis-server --dir      31 minutes ago
342sfasfba31    crosbymichael/redis:latest      /redis-server --dir      32 minutes ago
3k2zbh212kn9    crosbymichael/redis:latest      /redis-server --dir      33 minutes ago
                                            └─ 610-1
```

FIG. 6

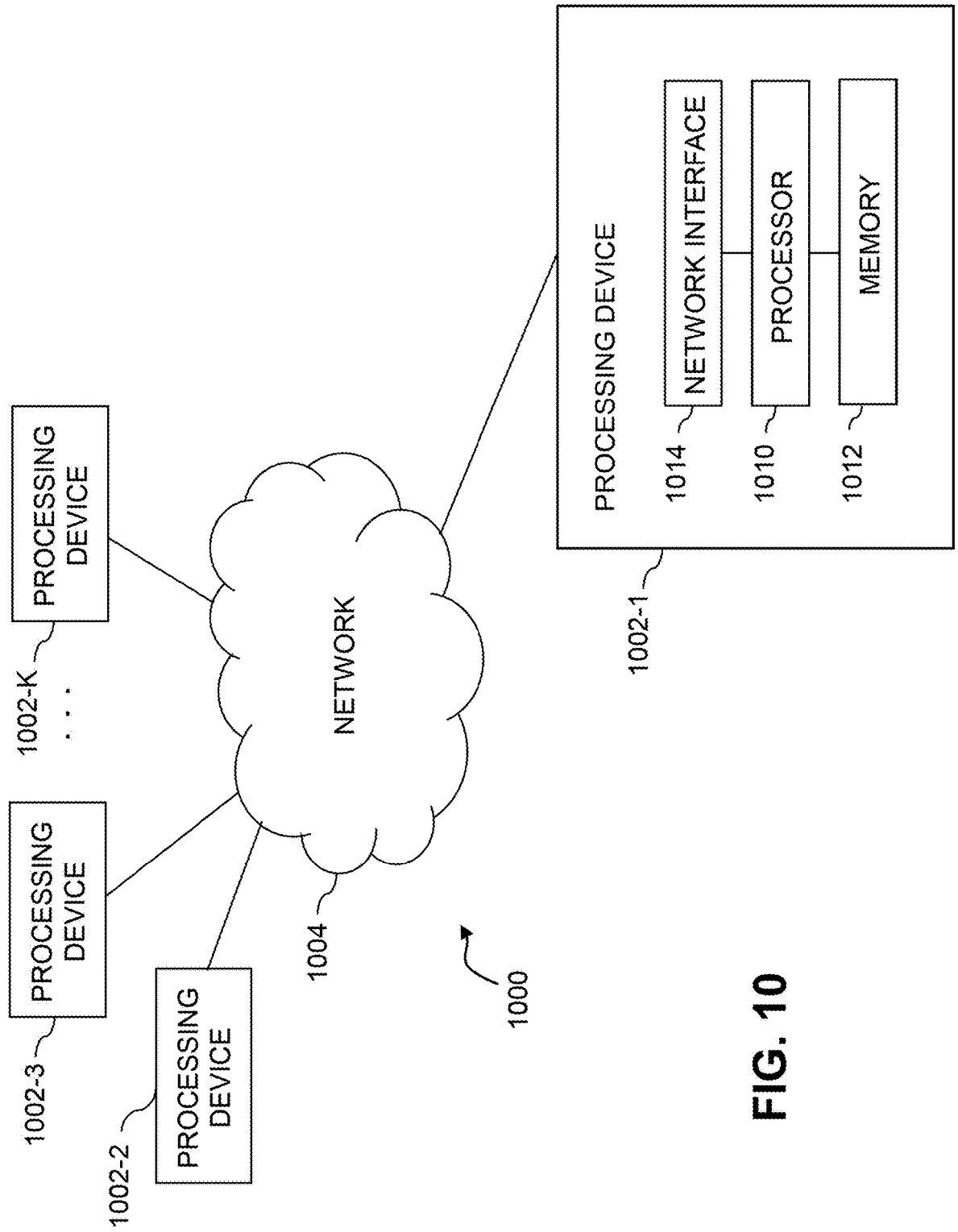

GROUP-BASED CONTAINER CHECKPOINT GENERATION

FIELD

The field relates generally to information processing systems, and more particularly to generation of checkpoints in such systems.

BACKGROUND

A given host device may be configured to support multiple processes that share access to a common memory. For example, host devices may be configured to utilize operating system level virtualization techniques such as Linux containers with each such container corresponding to a different process. These and other processes of a given host device may share memory for any of a number of different reasons, such as to facilitate implementation of functionality associated with pipelining, fast inter-process communication, resource throttling and many others. The containers are typically implemented using respective Linux kernel control groups ("cgroups"). Issues can arise when generating container checkpoints in such arrangements. For example, conventional systems are often configured to generate checkpoints for individual containers on a per-container basis, which can be highly inefficient, particularly in host devices that include large numbers of running containers. The excessive amounts of resources required to generate such container checkpoints can undermine system performance in a variety of contexts such as maintenance, upgrade, scale-out and migration.

SUMMARY

Illustrative embodiments provide techniques for efficient generation of checkpoints for containers running on a host device in an information processing system. For example, some embodiments implement techniques for group-based checkpointing of containers utilizing designated container groups. These and other embodiments can provide substantially more efficient generation of checkpoints for containers in a host device than would otherwise be possible using conventional techniques such as the above-noted generation of checkpoints for individual containers on a per-container basis. The checkpointing techniques can be readily deployed in a shared processing environment within cloud infrastructure, such as within a container-based Platform-as-a-Service (PaaS) cloud, as well as in numerous other information processing system environments.

In one embodiment, an apparatus comprises a host device that includes at least one processor and an associated memory. The host device is configured to implement a plurality of containers each configured to access one or more portions of the memory. The containers are implemented as respective kernel control groups utilizing operating system level virtualization of the processor of the host device. The host device is further configured to assign the containers to groups in accordance with one or more designated criteria, and to generate checkpoints for respective groups of the containers. In conjunction with generation of a given one of the checkpoints for a particular one of the groups of containers, the host device identifies one or more pages of the memory that are shared by at least first and second containers of the particular group of containers, and generates the given checkpoint without duplicating the one or more shared pages to persistent storage.

The shared pages can be shared, for example, due to different containers of a given container group performing memory mapping to a same shared region of the host device memory. Other types of sharing can result due to different containers of a given container group having pages with the same content, as detected through use of sampling-based hash digests or other deduplication techniques.

The host device is also illustratively configured to restore the particular group of containers from the given checkpoint.

In some embodiments, one of the containers of the particular group is designated as a leader container and one or more other containers of the particular group are each designated as a follower container.

The container designated as the leader container for the particular group may comprise the container that utilizes the largest portion of the memory relative to all of the containers of the particular group, with all other containers of the particular group being designated as respective follower containers.

In conjunction with generation of the given checkpoint, pages of at least one memory range of the leader container are compared with pages of a corresponding memory range of each of one or more follower containers to identify the one or more shared pages.

The host device may be configured to generate the given checkpoint for the particular group of containers by dumping all pages of the leader container to the persistent storage, and dumping pages of the follower containers less any pages shared with the leader container to the persistent storage.

The host device may be configured to restore the particular group of containers from the given checkpoint by restoring the leader container from the given checkpoint, and responsive to restoration of the leader container from the given checkpoint, restoring the one or more follower containers from the given checkpoint.

The host device in some embodiments is configured to identify the shared pages by performing page-to-page comparison between respective pages of the respective first and second containers starting at a specified offset within the containers. For example, the page-to-page comparison may comprise generating a first hash of at least a portion of a given page of the first container, generating a second hash of at least a portion of a corresponding page of the second container, comparing the first and second hashes, and identifying the page as a shared page responsive to a match between the first and second hashes.

Additionally or alternatively, the host device may be configured to identify the shared pages utilizing a shared memory data structure that comprises a plurality of different sets of shared data bytes each having an index identifier and a length, and wherein a given one of the containers that shares the data bytes of a particular one of the sets of data bytes with another one of the containers is characterized by a data structure that includes a starting address, a length, a share flag and a corresponding one of the index identifiers.

These and other illustrative embodiments described herein include, without limitation, methods, apparatus, systems, and computer program products comprising processor-readable storage media.

BRIEF DESCRIPTION OF THE DRAWINGS

FIG. 6 shows a listing of containers that includes a plurality of related containers that are designated as a container group.

FIGS. 9 and 10 show examples of processing platforms that may be utilized to implement at least a portion of an information processing system in illustrative embodiments.

DETAILED DESCRIPTION

Illustrative embodiments will be described herein with reference to exemplary information processing systems and associated host devices, storage devices and other processing devices. It is to be appreciated, however, that these and other embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources.

An information processing system may therefore comprise, for example, at least one data center that includes one or more clouds hosting multiple tenants that share cloud resources. Such systems are considered examples of what are more generally referred to herein as cloud computing environments. The term "cloud infrastructure" as used herein is intended to be broadly construed to encompass these and other information processing system environments that include at least a portion of at least one cloud. Numerous other types of enterprise and cloud-based computing and storage systems are also encompassed by the term "information processing system" as that term is broadly used herein.

Figure 1:
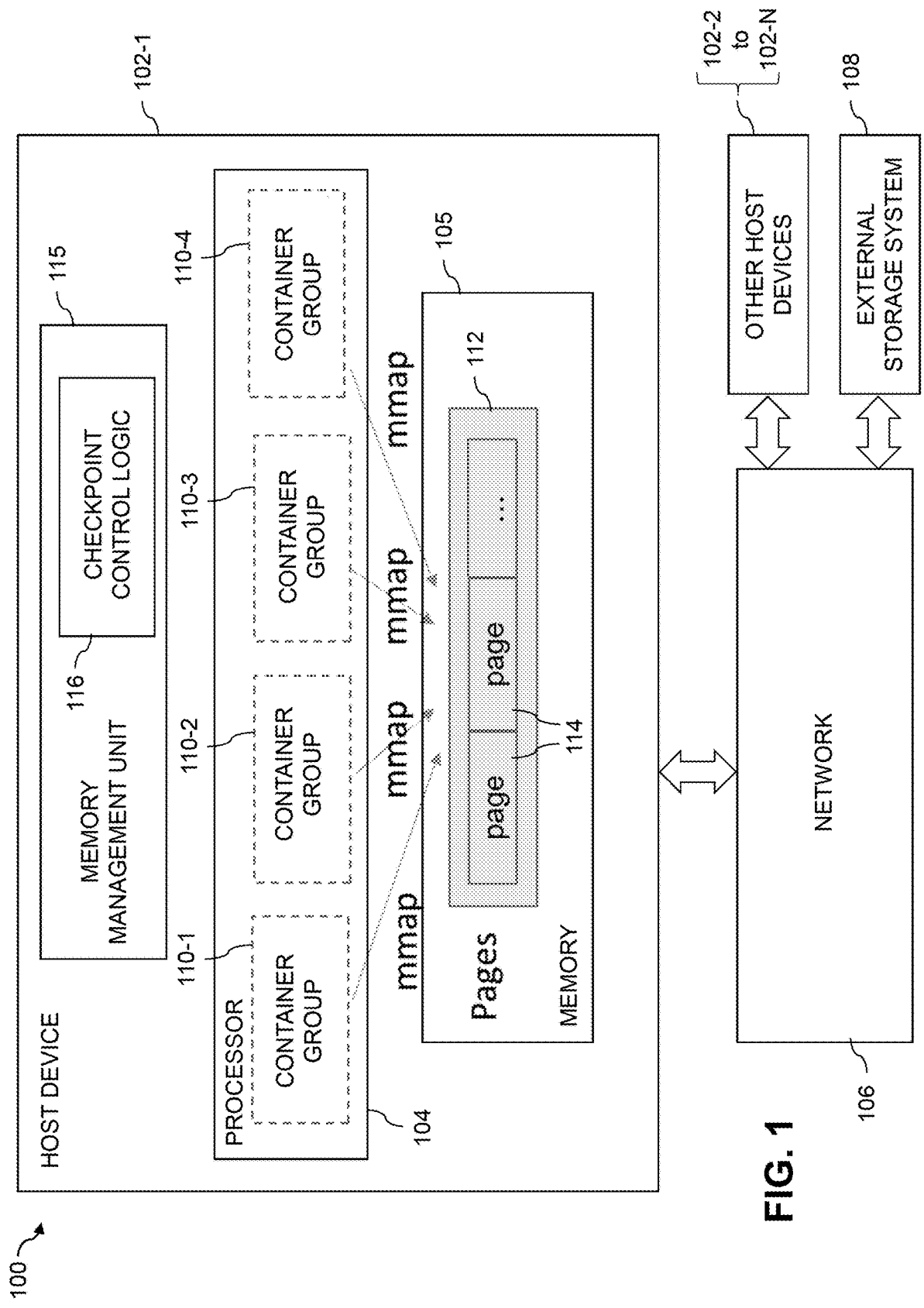
FIG. 1 is a block diagram of an information processing system comprising at least one host device configured for group-based container checkpointing in an illustrative embodiment.

FIG. 1 shows an information processing system 100 configured to implement functionality for group-based container checkpointing. The system 100 comprises a first host device 102-1 comprising a processor 104 and an associated memory 105. The host device 102-1 is configured to communicate over a network 106 with other host devices 102-2 through 102-N and an external storage system 108.

The host device 102-1 is configured to implement a plurality of container groups 110-1, 110-2, 110-3 and 110-4, each comprising two or more containers. The containers of one or more of the container groups 110 are each configured to access one or more portions of the memory 105. The one or more portions of the memory 105 more particularly include for at least a subset of the containers a shared region 112 of the memory 105 and at least one other portion of the memory 105.

The shared region 112 comprises a plurality of pages 114. The pages in some embodiments are illustratively of a designated fixed size, such as 4 kilobytes (KB), 8 KB or 16 KB, although other page sizes can be used in other embodiments. One or more of the containers of at least a subset of the container groups 110 each execute a memory mapping ("mmap") function to map to one or more of the pages 114 of the shared region 112.

The containers of the container groups 110 in some embodiments are implemented as respective kernel control groups ("cgroups") utilizing operating system level virtualization of the processor 104 of the host device 102-1. A given container may be viewed as an example of a type of "process" that may be implemented by the processor 104 in conjunction with execution of one or more applications on behalf of one or more users of the system 100.

The host device 102-1 further comprises a memory management unit 115 having checkpoint control logic 116. The checkpoint control logic 116 is configured to control the generation of group-based container checkpointing in the host device 102-1. For example, under the control of the checkpoint control logic 116, the host device 102-1 is illustratively configured to assign different containers executing on the host device 102-1 to particular ones of the container groups 110 in accordance with one or more designated criteria, and to generate checkpoints for respective ones of the container groups 110.

In conjunction with generation of a given one of the checkpoints for a particular one of the container groups 110, the host device 102-1 is further configured to identify one or more pages of the memory 105 that are shared by at least first and second containers of the particular group of containers, and to generate the given checkpoint without duplicating the one or more shared pages to persistent storage.

The shared pages can be shared, for example, due to different containers of a given container group performing memory mapping to a same shared region of the host device memory. Other types of sharing can result due to different containers of a given container group having pages with the same content, as detected through use of sampling-based hash digests or other deduplication techniques. Accordingly, the term "shared page" as used herein is intended to be broadly construed, so as to encompass, for example, pages that are shared between containers of a given container group based on memory mapping to a particular region of shared memory, or based on the pages having the same content. Also, a "page" of memory should not be construed as being limited to a particular size or format.

The host device 102-1 is further configured to restore the container groups 110 from their respective checkpoints when necessary.

In some embodiments, one of the containers of a particular one of the container groups 110 is designated as a leader container and one or more other containers of the particular container group are designated as respective follower containers.

For example, the container designated as the leader container for the particular container group may comprise the container that utilizes the largest portion of the memory 105 relative to all of the containers of the particular group, with all other containers of the particular group being designated as respective follower containers.

In conjunction with generation of the given checkpoint, pages of at least one memory range of the leader container are compared with pages of a corresponding memory range of each of one or more follower containers to identify the one or more shared pages. Other techniques may be used to identify pages shared by the leader container and one or more of the follower containers of the particular container group.

Other ones of the container groups 110 are processed in a similar manner under the control of the checkpoint control logic 116 to identify shared pages so as to allow the host device 102-1 to avoid duplicating shared pages to persistent storage when generating checkpoints for the respective container groups 110.

For example, in some embodiments, the host device 102-1 is further configured to generate the given checkpoint for a particular one of the container groups 110 by dumping all pages of the leader container to the persistent storage, and dumping pages of the follower containers less any pages shared with the leader container to the persistent storage.

The host device 102-1 can then restore the particular container group from the given checkpoint by restoring the leader container from the given checkpoint, and responsive to restoration of the leader container from the given checkpoint, restoring the one or more follower containers from the given checkpoint. Efficiencies are thereby obtained both on generation of group-based container checkpoints as well as on restoration of container groups from their respective group-based container checkpoints.

As noted above, the host device 102-1 under the control of the checkpoint control logic 116 is configured to utilize one or more designated criteria to assign containers to groups. Such criteria may include, for example, a first rule specifying that containers created from the same container image are assigned to the same group, or a second rule specifying that containers allocated to a given user are assigned to the same group. Various logical combinations of these and other rules are possible. For example, the host device 102-1 in assigning containers to groups may apply a third rule comprising a combination of at least the first and second rules in accordance with a particular logic function. Accordingly, as a more particular example, all containers that are created from the same image and allocated to a given user may be assigned to the same container group. A wide variety of additional or alternative criteria may be used to assign containers to container groups in illustrative embodiments. Such criteria in some embodiments are configured to maximize the deduplication potential between containers of a given group by ensuring that those containers that are likely to share relatively large numbers of memory pages are assigned to the same group. Terms such as "criterion" or "criteria" as used herein are intended to be broadly construed so as to encompass one or more rules, conditions or other similar information specifying grouping of containers having certain characteristics in common, as well as combinations of such information.

In some embodiments, the host device 102-1 is configured to generate the group-based container checkpoints for respective ones of the container groups 110 at least in part in parallel with one another. An example of an arrangement of this type will be described in more detail below in conjunction with the flow diagram portion of FIG. 4.

The checkpoint control logic 116 can implement these and other operations at least in part in the form of one or more background threads executing on the processor 104 of the host device 102-1.

It should be noted that functionality described herein as being performed by or under the control of the memory management unit 115 and/or the checkpoint control logic 116 can in other embodiments be performed at least in part by other portions of the host device 102-1 or by other components of the system 100. Also, components such as checkpoint control logic 116 can be implemented at least in part in the form of software that is stored in a program storage portion of memory 105 and executed by the processor 104.

The host device 102-1 in some embodiments may comprise one or more virtual machines controlled by a hypervisor of a processing platform, although a wide variety of other types of host devices may be used.

The host device 102-1 in some embodiments is more particularly implemented as a container host device. The host device 102-1 and the additional host devices 102-2 through 102-N, collectively referred to herein as host devices 102, are examples of what are more generally referred to herein as "processing devices" of the one or more processing platforms of the system 100. Each such processing device of a given processing platform comprises at least one processor coupled to a memory.

It is assumed in this embodiment that each of the other host devices 102-2 through 102-N is configured in a manner similar to host device 102-1 as described above and illustrated in the figure.

The system 100 in some embodiments comprises a plurality of compute nodes with each such compute node comprising one or more of the host devices 102. The compute nodes can be implemented on respective separate processing platforms. Alternatively, different compute nodes can be implemented on respective different processing platforms coupled together via the network 106.

The compute nodes may comprise respective compute nodes of cloud infrastructure, such as an Amazon Web Services (AWS) system. Other examples of cloud-based systems that can be used to implement compute nodes and their respective host devices and possibly other portions of system 100 include Google Cloud Platform (GCP) and Microsoft Azure. The compute nodes may be implemented on a per-tenant basis and extend in a distributed manner across host devices of multiple public, private or hybrid clouds.

A given such cloud can comprise a Platform-as-a-Service (PaaS) layer overlying an Infrastructure-as-a-Service (IaaS) layer. The IaaS layer may comprise a plurality of virtual machines supporting application containers of the PaaS layer. For example, host devices in such an embodiment illustratively correspond to respective ones of the virtual machines of the IaaS layer.

It should be noted that the description above and elsewhere herein relating to host devices 102 should not be viewed as limiting in any way. Other embodiments can utilize other types of host devices 102, including "bare metal" hosts. The term "host device" as used herein is therefore intended to be broadly construed.

The host devices 102 in the present embodiment each access the external storage system 108 over network 106. For example, the host devices 102 may be configured to access the external storage system 108 using respective storage drivers implemented in those host devices 102. Such drivers can include block-based storage drivers such as DeviceMapper ("DM") or file-based storage drivers such as Advanced multi-layered Unification File System (AUFS). Other alternative drivers include ZFS storage drivers, and many others, including Overlay File System (OverlayFS) drivers, Btrfs drivers, etc. Combinations of multiple such distinct drivers can also be used. The containers of the container groups 110 may be coupled via respective TO data paths to external bind volumes in the external storage system 108. Such external storage arrangements are illustratively implemented via corresponding Docker volume plugin modules such as REX-Ray from Dell EMC.

The external storage system 108 may be configured to provide data services for one or more containers of the host devices 102. A given one of the containers or a set of such containers may be associated with a particular tenant of the system 100. Different storage volumes or other portions of the external storage system 108 are illustratively allocated to respective ones of the containers.

Examples of data services that may be provided for containers by the external storage system 108 include data caching services, storage tiering services, data deduplication services, networking services and data security services. Numerous other types of data services may additionally or alternatively be implemented for particular containers of the container groups 110. Some of the data services may run at least in part in the corresponding host devices. For example, caching services may involve one or more caches of respective host devices. As another example, tiering hints for a storage tiering service can be generated in the host devices. As a further example, one or more deduplication domains for a deduplication service may be in one of the host devices 102 rather than in the external storage system 108.

As indicated above, the containers are illustratively configured for executing at least portions of one or more applications on behalf of one or more tenants of cloud infrastructure of the system 100. Such cloud infrastructure of system 100 illustratively comprises the host devices 102 and the external storage system 108. Different ones of the containers may be associated with different tenants. Alternatively, multiple ones of the containers may be associated with a single one of the tenants.

The containers of the container groups 110 in some embodiments comprise respective jobs within a larger application task such as a task associated with MPI, MapReduce, Spark or other processing frameworks.

In the FIG. 1 embodiment, it is assumed that the containers of the container groups 110 allocate portions of the shared region 112 for their use via a common memory sharing mechanism, illustratively a POSIX memory map ("mmap") function. Other memory sharing mechanisms can be used, such as SystemV shmget/attach interfaces.

Such memory sharing may be used to avoid duplicate data loading. For example, a file or common library may be loaded once from the external storage system 108 into the shared region 112 of the memory 105, and then shared across at least a subset of the containers of the container groups 110. The data in some cases comprises read-only data. Additionally or alternatively, the data may comprise writeable data, in which case copy-on-write (COW) mechanisms may be used in conjunction with processing of the shared data.

The memory sharing can also be used to facilitate interprocess communication (IPC) functionality in the host device 102-1. For example, in some embodiments, a particular one of the containers initially creates a mmap handle, and then one or more other containers would mmap the same area for data exchange. Application tasks associated with processing frameworks such as MPI, MapReduce, Spark and many others may involve launching multiple worker processes via mmap IPC.

Although mmap functionality is used for memory mapping in the FIG. 1 embodiment and one or more other embodiments disclosed herein, alternative embodiments can utilize other types of memory mapping techniques, including the above-noted SystemV shmget/attach interfaces. It is also possible that some embodiments will not utilize these or any other memory mapping techniques.

At least portions of the containers of one or more of the container groups 110 may additionally or alternatively obtain exclusive access to other portions of the memory 105 outside of the shared region 112.

In some embodiments, at least a subset of the containers of the container groups 110 utilize file-based shared memory functionality, illustratively implemented in the form of/dev/shm with a unique file handle, rather than anonymous shared memory functionality. Also, although some containers are illustratively configured to perform mmap operations to the shared region 112 using a common mapping size, other embodiments can implement mmap operations using different mapping sizes for different containers.

The above-described functionality for group-based container checkpointing in this embodiment may be implemented at least in part in the form of one or more background threads and other types of software executed by the host device 102-1. Again, the other host devices 102-2 through 102-N are assumed to be implemented in substantially the same manner as described above for host device 102-1. Thus, each of the host devices 102 can implement group-based container checkpointing as disclosed herein.

As indicated previously, at least portions of the information processing system 100 are implemented in cloud infrastructure. The cloud infrastructure of the system 100 can comprise a public cloud, a private cloud or a hybrid cloud or an associated data center or other type of system implemented on one or more processing platforms. The term "cloud" as used herein is intended to be broadly construed so as to encompass, for example, combinations of multiple clouds of different types.

For example, cloud native applications can execute in respective application containers implemented utilizing the host devices 102. The host devices 102 may implement Docker containers, LXD containers, Cloud Foundry Diego-based containers or other types of containers. The data required for execution of the cloud native applications is obtained at least in part from the external storage system 108.

The external storage system 108 can comprise any of a variety of different types of storage including network-attached storage (NAS), storage area networks (SANs), direct-attached storage (DAS), distributed DAS and software-defined storage (SDS), as well as combinations of these and other storage types. The storage platforms can be configured to provide storage for data of multiple distinct types, including blocks, objects and files.

By way of example, the external storage system 108 of system 100 in some embodiments comprises at least one of network file system (NFS) SAN-based storage and cloud-based storage.

Cloud-based storage of external storage system 108 may comprise at least one object store implemented using cloud storage such as Elastic Cloud Storage (ECS) from Dell EMC. Other examples of object stores that can be utilized to provide at least a portion of external storage system 108 in some embodiments include Amazon Simple Storage Service (S3), GCP Cloud Storage, and Microsoft Azure Blob Storage.

In some embodiments, the external storage system 108 is implemented as a multi-tier storage system comprising at least a fast tier and a capacity tier. The fast tier illustratively comprises non-volatile electronic memory and the capacity tier comprises at least one object store. Tiering hints from applications running in the containers may be used to control movement of data between the fast and capacity tiers.

The example storage system configurations described above may be part of the same processing platform or platforms that also implement cloud infrastructure used to provide at least a subset of the host devices 102.

Containers implemented in the system 100 can utilize COW techniques to provide point-in-time logical views of the data from external storage system 108 that is processed by those containers.

For example, COW allows multiple containers to share access to data stored in the external storage system 108. If an application process in a given one of the containers needs to modify a file, block, object or other item of shared data, a separate local copy of that data item is generated on which the given container can make its modifications, while the original shared data item visible to other ones of the containers remains unchanged. These and other COW techniques typically store the resulting multiple copies in the form of layers in which each layer stores only the modifications relative to one or more other layers.

A given running container on one of the host devices 102 of the system 100 is launched utilizing one or more container images. The container images are illustratively part of a layer structure that includes multiple read-only (RO) layers associated with respective container images and multiple read/write (RW) layers associated with multiple running containers that utilize those container images. The RO layers comprise static container images and the RW layers comprise running container instances based on container images that are loaded into memory. The layer structure is in the form of a tree-like hierarchy, with parent-child relationships between the container images of the various layers. Other types of layer structures can be used in other embodiments.

The container images of the respective RO layers in the Docker context include respective differential or "delta" layers each created in conjunction with a corresponding COW operation. A given running container is part of an RW layer and is created utilizing a container image of an immediately overlying RO layer which is itself related back through the layer structure to a base RO layer via one or more intermediate RO layers. Multiple related RO layers of the layer structure therefore collectively provide the single container image that is utilized to generate the given running container.

As indicated previously, container checkpointing can be problematic in that checkpoints are typically generated for individual containers on a per-container basis, which can be highly inefficient, particularly in host devices that include large numbers of running containers. The excessive amounts of resources required to generate such container checkpoints can undermine system performance in a variety of contexts such as maintenance, upgrade, scale-out and migration.

An example of a conventional container checkpointing arrangement that checkpoints containers individually and therefore has the drawbacks noted above is known as Checkpoint & Restore in Userspace (CRIU). The CRIU technique and other similar techniques that checkpoint individual containers on a per-container basis can lead to shared pages being duplicated multiple times to persistent storage, which unduly increases the number of IO operations as well as the running time associated with checkpointing of multiple containers. Similar issues arise in the recovery of containers from their respective individual checkpoints, thereby undermining restore performance.

Illustrative embodiments disclosed herein implement group-based container checkpointing arrangements that exhibit significantly enhanced efficiency relative to per-container checkpoint generation. These embodiments not only result in improved system performance in conjunction with generation of container checkpoints, but also in recovery of containers from their respective checkpoints.

Additional details of illustrative embodiments will now be described with reference to FIGS. 2 through 8.

Figure 2:
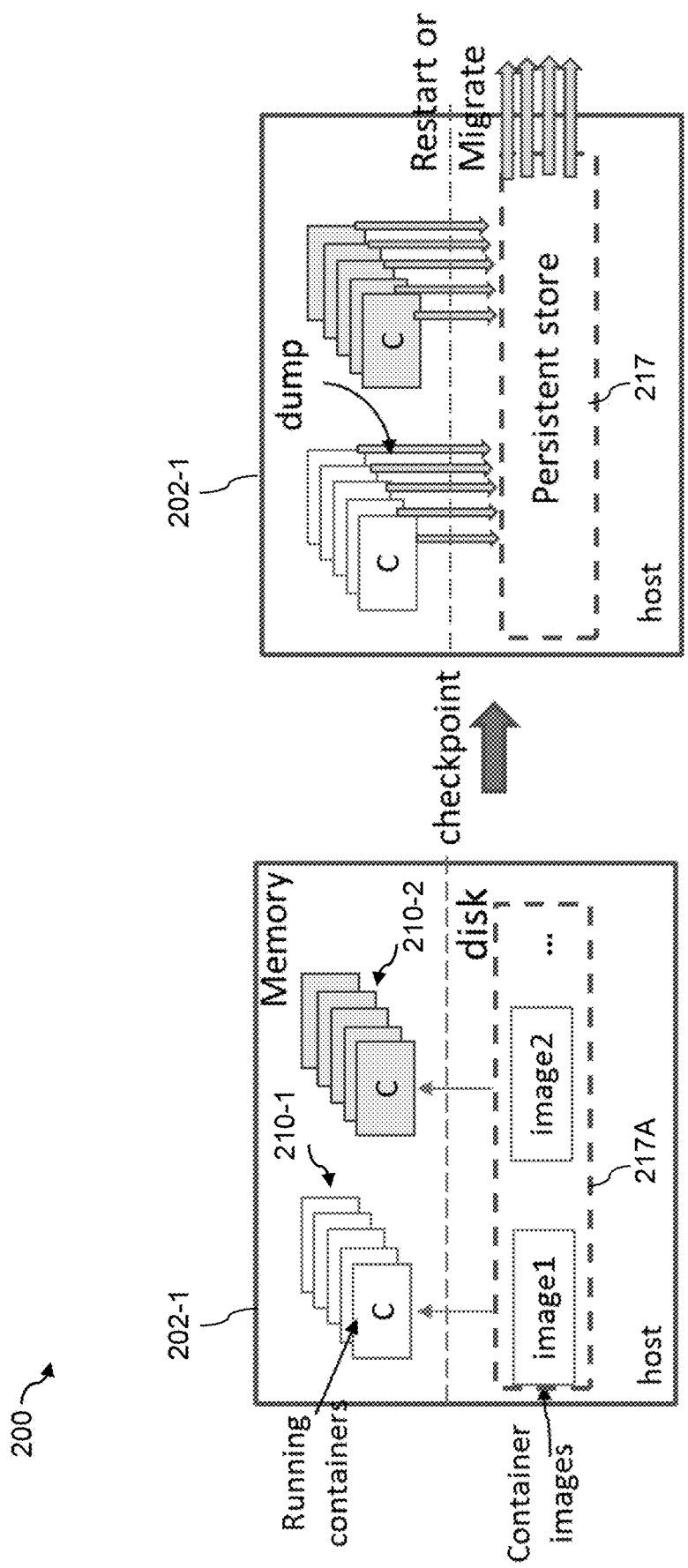
FIGS. 2 and 3 illustrate different checkpoint-related aspects of illustrative embodiments.

Referring now to FIG. 2, an information processing system 200 comprises a host device 202-1 that includes first and second container groups 210-1 and 210-2, each of which includes a set of running containers that are grouped together for checkpointing purposes using the techniques disclosed herein. Although only two container groups are shown in this figure and certain other figures herein, the corresponding host devices can of course include more than two container groups.

The container groups 210 in this embodiment utilize a memory of the host device 202-1. Each of the containers is generated using a corresponding one of a plurality of container images which are illustratively stored in disk storage resources 217A that are assumed to comprise at least a portion of persistent storage 217 of the host device 202-1.

The host device 202-1 is assumed to generate group-based container checkpoints for the respective container groups 210 in the manner described previously herein. This illustratively involves, for each of the container groups 210-1 and 210-2, identifying one or more pages of the host device memory that are shared by at least first and second containers of that container group, and generating the corresponding checkpoint without duplicating the one or more shared pages to persistent storage 217. The checkpoint generation process therefore dumps pages to the persistent storage 217 in a manner that avoids duplication of pages that are shared between different containers of the same container group.

The resulting efficiently-generated checkpoints can be utilized to provide efficient restoration operations such as restarting of the container groups, migration of the container groups to another host device, and many others.

Although persistent storage 217 is shown as part of the host device 202-1 in the FIG. 2 embodiment, this is by way of illustrative example only, and in other embodiments the persistent storage may be part of a separate storage system, such as the external storage system 108 in system 100.

Figure 3:
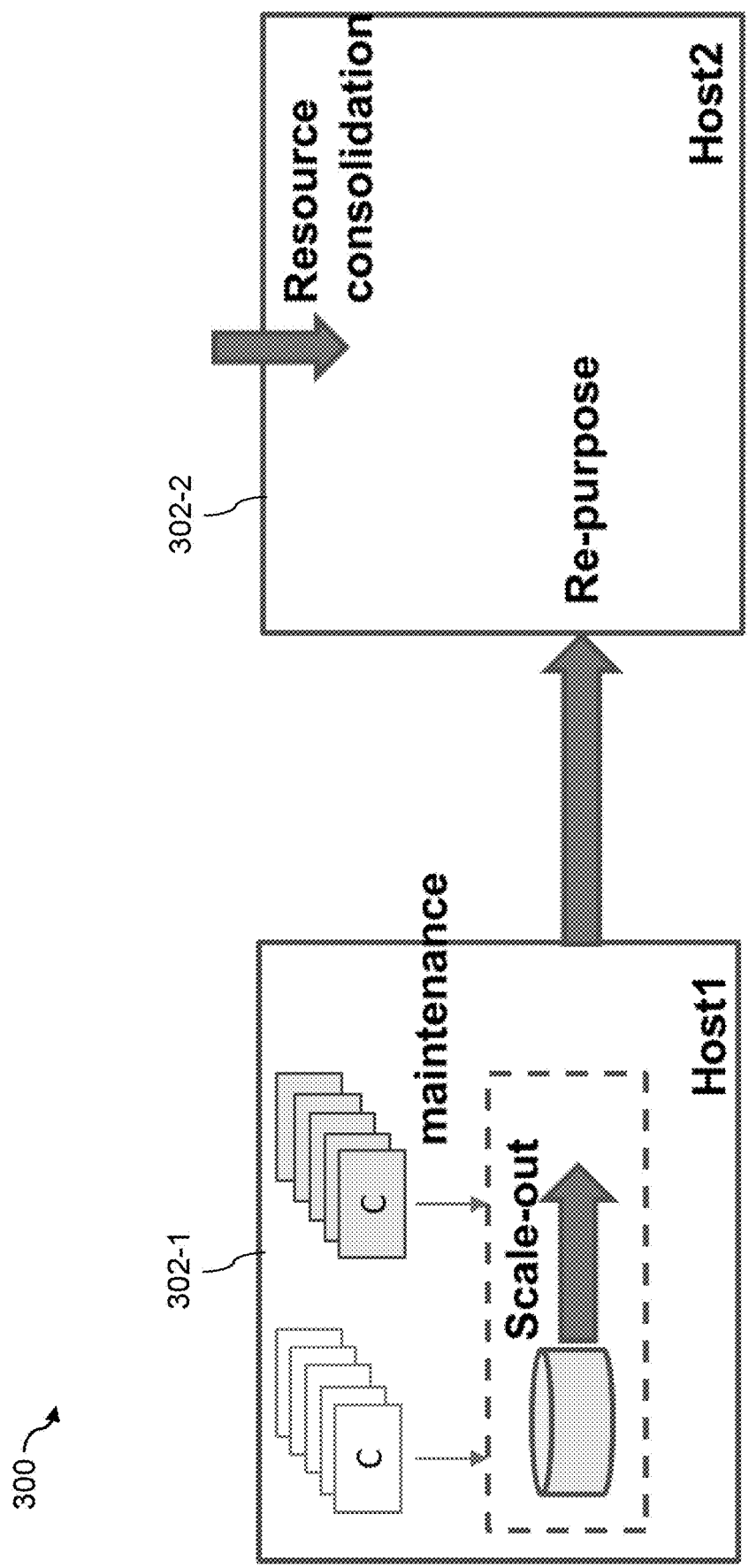

FIG. 3 shows another information processing system 300 comprising first and second host devices 302-1 and 302-2. In this embodiment, group-based container checkpointing functionality implemented in host device 302-1 in the manner described previously is utilized to support additional functionality such as maintenance, upgrade, scale-out and migration. For example, with regard to maintenance or upgrade, it may be necessary to "evacuate" all of the containers from the first host device 302-1 in conjunction with a host-level hardware or operating system upgrade or maintenance. The container groups are therefore checkpointed into persistent storage and later can be quickly reloaded and resumed on the first host device 302-1 or on another host device such as second host device 302-2.

The group-based container checkpoints are assumed in some embodiments to provide sufficient information to allow each container of a given container group to be replayed to its last active state. Such group-based container checkpoints can be taken periodically, or under other specified conditions.

Scale-out can be implemented in the system 300 by increasing the number of containers within each container group, without significantly increasing the amount of time required to generate the corresponding group-based container checkpoints.

In some embodiments, scale-out involves scaling from a single running container of a particular type to multiple running containers of that particular type, possibly repeated for multiple distinct container types. Such scale-out functionality can be implemented locally at the first host device 302-1 or at a different host device such as second host device 302-2 in order to provide service scalability across multiple host devices. Each such host device can implement front-end load balancing in order to facilitate partitioning of incoming service requests across the multiple host devices.

Container groups of the first host device 302-1 can be repurposed for use on the second host device 302-2. For example, production containers on the first host device 302-1 can be cloned to the second host device 302-2 for testing, analytics or other purposes.

Other functions such as resource consolidation using the second host device 302-2 are similarly supported in system 300. For example, one or more container groups can each be checkpointed on host device 302-1, migrated from host device 302-1 to host device 302-2, and then shut down on the host device 302-1, in order to consolidate container resources within the system 300.

Figure 4:
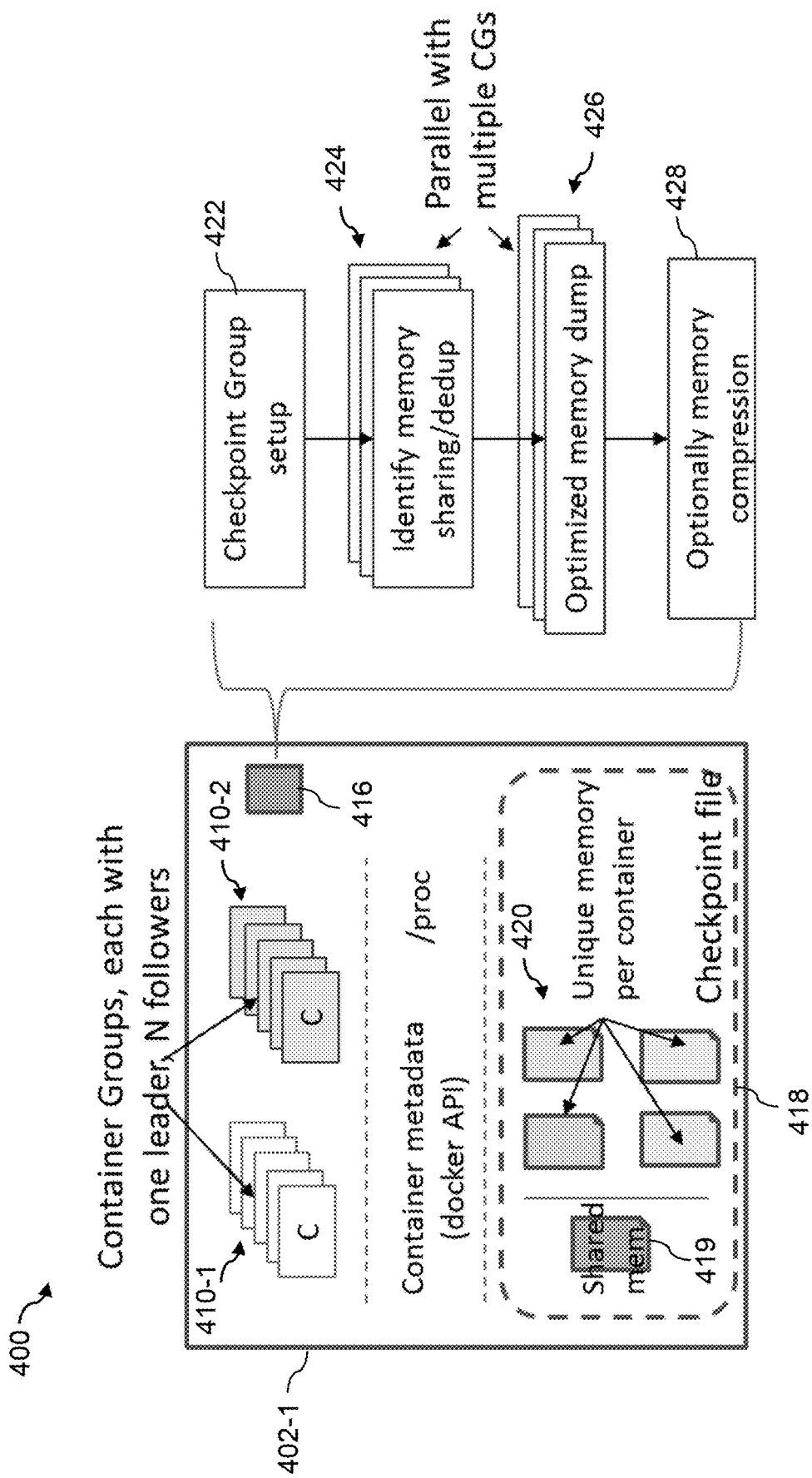
FIG. 4 is a combined block diagram and flow diagram showing an example of group-based container checkpointing in an illustrative embodiment.

Another illustrative embodiment is shown in FIG. 4. In this embodiment, an information processing system 400 comprises a host device 402-1 configured to implement group-based container checkpointing. The host device 402-1 includes first and second container groups 410-1 and 410-2, and possibly one or more additional container groups not explicitly shown, each of which includes a set of running containers that are grouped together for checkpointing purposes using the techniques disclosed herein.

The container groups 410 more particularly comprise N+1 containers, each including one container designated as a leader container, and N additional containers designated as respective follower containers.

Figure 5:
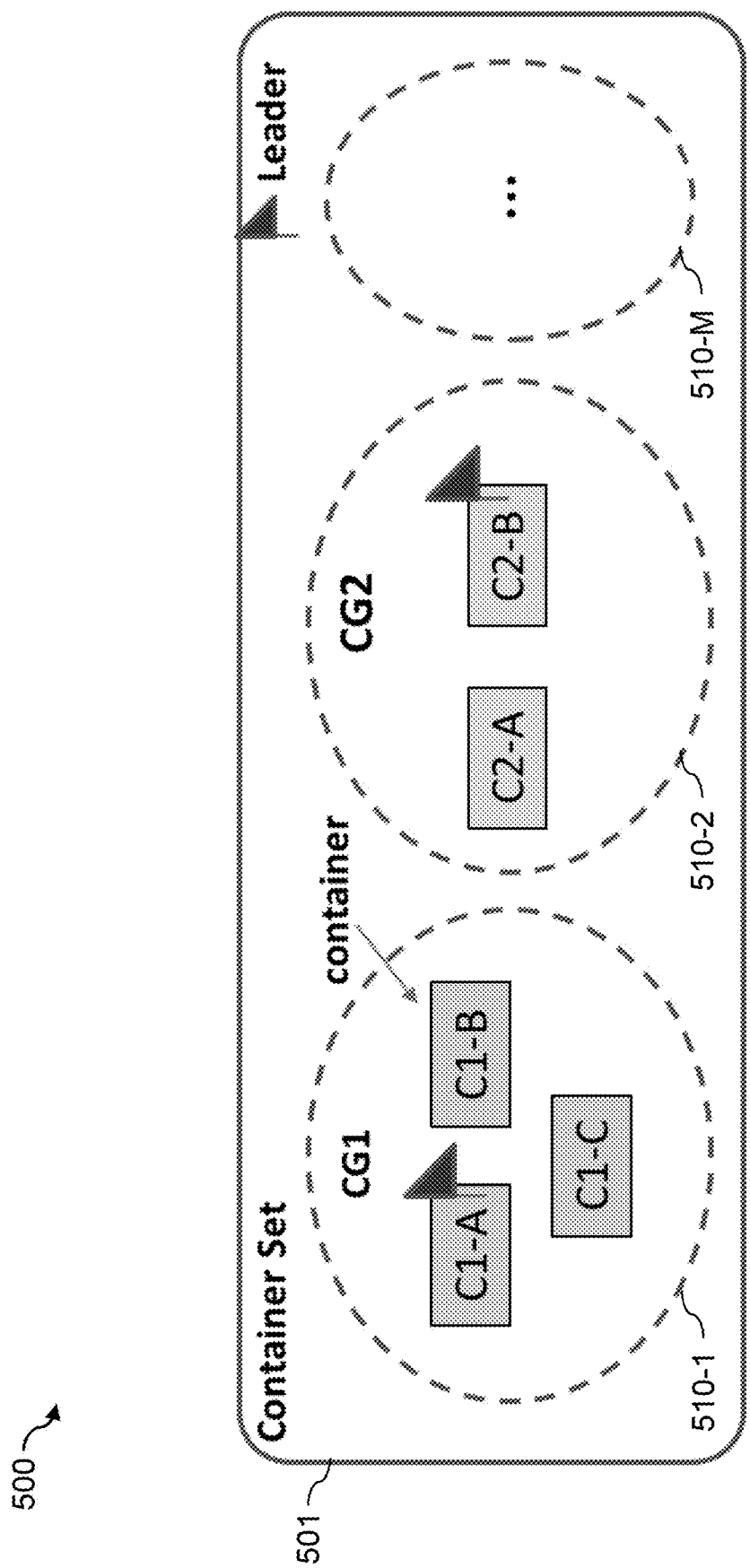
FIG. 5 shows an example of a container set comprising multiple groups of containers with each such group having a leader container and at least one follower container.

It is also possible that the container groups 410 can each include different numbers of containers. An example of an arrangement of this type is shown in FIG. 5, which illustrates a portion of an information processing system 500 comprising a container set 501. The container set 501 is illustratively implemented on a single host device of the system 500, and may comprise all of the containers implemented on that host device or a subset of the containers implemented on that host device.

The container set 501 includes M distinct container groups 510-1, 510-2, . . . 510-M, having potentially different numbers of containers. For example, container group 510-1 is also denoted CG1 and comprises containers C1-A, C1-B and C1-C, with container C1-A being designated as the leader container and containers C1-B and C1-C being designated as respective follower containers. Similarly, container group 510-2 is also denoted CG2 and comprises containers C2-A and C2-B, with container C2-B being designated as the leader container and container C2-A being designated as a follower container.

Returning now to the FIG. 4 embodiment, the host device 402-1 is configured to access container metadata using a Docker API. The host device 402-1 in this embodiment illustratively utilizes a Proc file system interface ("/proc") and can further leverage operating system features such as a Ptrace interface to facilitate operations such as memory access, copying and change tracking.

The host device 402-1 is further configured to generate group-based container checkpoints for the respective container groups 410 utilizing checkpoint control logic 416. The checkpoint control logic 416 causes the host device 402-1 to perform the process shown in the flow diagram at the right side of the figure. Other types of checkpoint control logic can be used in other embodiments.

In generating a group-based container checkpoint for a given one of the container groups 410, the host device 402-1 generates the checkpoint as a checkpoint file 418 to be stored in persistent storage of the system 400. The checkpoint file 418 includes a shared memory portion 419 comprising one or more memory pages identified by the host device 402-1 as being shared by two or more containers of the container group. The checkpoint file 418 also includes multiple unique portions 420 each comprising one or more pages that are unique to a corresponding one of the containers of the container group.

Additional checkpoint files are generated in a similar manner for each of the other container groups. It is to be appreciated that this particular file format is presented by way of illustrative example only, and a wide variety of other checkpoint file formats or other types of group-based container checkpoints may be used.

The process implemented under the control of the checkpoint control logic 416 includes steps 422, 424, 426 and 428. The process as illustrated in the figure generally involves, for each of the container groups 410, identifying one or more pages of the host device memory that are shared by at least first and second containers of that container group, and generating the corresponding checkpoint without duplicating the one or more shared pages to persistent storage of the system 400. The checkpoint generation process therefore dumps pages to the persistent storage of the system 400 in a manner that avoids duplication of pages that are shared between different containers of the same container group. At least a portion of the persistent storage of the system 400 may comprise disk storage resources or other non-volatile storage resources of the host device 402-1.

In step 422, the host device 402-1 sets up the container groups by assigning containers to groups in accordance with one or more designated criteria. As described previously, such criteria illustratively comprise rules, conditions or other characteristics which tend to indicate a high level of deduplication potential between containers. For example, containers generated from the same container image may be assigned to the same container group, or containers generated for the same system user may be assigned to the same container group. Combinations of multiple criteria are also possible, as in an arrangement in which containers generated from the same container image and for the same system user are assigned to the same container group. Other examples of criteria that may be applied in assigning containers to groups include a rule that assigns containers running the same application or set of applications to the same container group, a rule that assigns containers created using the same template to the same container group, and numerous others, as well as combinations thereof.

The one or more designated criteria applied by the host device 402-1 in assigning containers to container groups are generally configured to ensure that containers that are likely to share relatively large numbers of memory pages tend to be grouped together into a common container group.

An example of a container group formation operation in step 422 of the FIG. 4 process is illustrated in FIG. 6, which shows identifying information associated with a set of Docker containers 600. The set of Docker containers 600 illustratively includes multiple related containers that are designated by the host device 402-1 as comprising a particular container group 610-1. In this embodiment, there are three containers in the set of Docker containers 600 that are generated from the same container image, and those three containers are all assigned by the host device 402-1 to the container group 610-1. The first container of the container group 610-1 is assigned as the leader container, and the other two containers are follower containers. Additional containers can be assigned to container groups in system 400 in a similar manner, or utilizing additional or alternative rules, conditions, characteristics or other criteria.

Returning again to FIG. 4, the host device 402-1 in step 424 identifies memory sharing and/or other deduplication potential between the containers for each of the container groups. For example, the host device 402-1 identifies for each of the container groups, one or more memory pages that are shared by two or more containers of that container group. This shared page identification portion of the process is illustratively performed at least partially in parallel for the multiple container groups ("CGs") 410.

As a more particular example, in conjunction with generation of a checkpoint for a given one of the container groups 410, pages of at least one memory range of the leader container of the container group are compared with pages of a corresponding memory range of each of one or more follower containers of the container group to identify the one or more shared pages for that container group.

The identification of memory sharing in step 424 of the FIG. 4 process illustratively includes identifying those containers of a particular container group that have loaded the same file into memory via one or more mmap operations. Other deduplication potential can be identified, for example, by identifying anonymous (RO) memory shared by related process threads such as parent-child threads or between containers from the same container image, or by identifying duplicate content between containers.

At least portions of this identification step for one or more container groups can utilize existing infrastructure functionality such as Kernel Samepage Merging (KSM). Additionally or alternatively, some embodiments can utilize a quick memory sampling-based hash digest approach. The identification can be restricted in some embodiments to particular offset ranges within an address space of the host device memory.

In some embodiments, identification of memory sharing in step 424 for a given container group involves the host device 402-1 leveraging the /proc interface to traverse memory information of each container and any associated child processes. For example, assuming a target process identifier as pid, the host device 402-1 can read /proc/pid/smaps, and /proc/pid/map_files/ to obtain information regarding memory areas of the container, such as whether or not the memory areas contain memory mapped files. If a memory mapped file is identified, the host device 402-1 records that information so that it can identify other memory areas that are memory mapped to the same file, thereby indicating potential shared pages.

The host device 402-1 can further utilize /proc/pid/pagemap to identify present memory pages. Non-present pages such as swapped-out pages are not dumped to persistent storage. Anonymous memory utilizing a map_file | map_private mapping indicates that the page in question is already COW-ed from the file. Non-anonymous pages are not dumped as they are still in synchronization with the file.

After the above-described traversals are complete, the host device 402-1 can compare the memory mapped files to identify any containers of the container group that are memory mapped from the same file. The corresponding memory regions, for present pages only, are then marked as a shared memory portion for the container, such that pages of that shared portion are dumped to persistent storage only once in generating the checkpoint for the container group in accordance with step 426 of the FIG. 4 process.

Additionally or alternatively, step 424 of the FIG. 4 process can be configured to implement deduplication content based at least in part on content of memory pages of containers of the container group. Such an arrangement illustratively compares particular portions of the memory regions associated with leader and follower containers, in some cases utilizing page-aligned sampling-based hash digests, possibly at particular offsets in order to limit the search space. The memory regions that are examined within a given container can comprise relatively large data regions, such as non-file memory mapped data regions greater than about 8 MB in size. A more detailed example of an arrangement of this type will be described in below in conjunction with FIG. 7.

In step 426, the host device 402-1 performs an optimized memory dump for each of the container groups 410. This generally involves generating the checkpoint file 418 and dumping the corresponding checkpoint to persistent storage in a manner that avoids duplicating shared pages within a given container group to the persistent storage. For example, the host device 402-1 may dump all pages of the leader container to the persistent storage, and then dump pages of the follower containers, less any pages shared with the leader container, to the persistent storage of the system 400.

Such an arrangement creates a group-based container checkpoint in which duplicate memory pages are dumped to persistent storage only once even though such memory pages are part of multiple containers of the container group. Additionally or alternatively, the host device 402-1 may be further configured to maintain a deduplication lookup table for the particular container group and to utilize the deduplication lookup table to ensure that the shared pages are not duplicated to the persistent storage in conjunction with the generation of the checkpoint for that group. Like step 424, step 426 of the process is illustratively performed at least partially in parallel for the multiple container groups 410.

The optimized memory dump in step 426 leverages the memory sharing and/or other deduplication potential identified between the containers of a container group in step 424 of the process. The dumping illustratively starts with the memory pages of the leader container, such that all present memory pages of the leader container are dumped to persistent storage before any present memory pages of any of the follower containers are dumped to persistent storage. Any page or other segment of memory that is shared and/or duplicated between at least two containers may be saved in a separate data structure having a unique index such that it can be easily referenced by multiple containers. An example format for these and other data structures will be described below in conjunction with FIG. 8.

In step 428, an optional memory compression operation is performed in conjunction with the dumping of memory pages to the persistent storage. The designation of this particular operation as "optional" should not be construed to mean that any other aspect of the FIG. 4 embodiment is required in one or more other embodiments.

The particular steps shown in the flow diagram portion of FIG. 4 are presented by way of illustrative example only, and can be varied in other embodiments.

As noted above, the host device in some embodiments is configured to identify the shared pages for a given one of the container groups by performing page-to-page comparison between respective pages of at least first and second containers starting at a specified offset within the containers.

Figure 7:
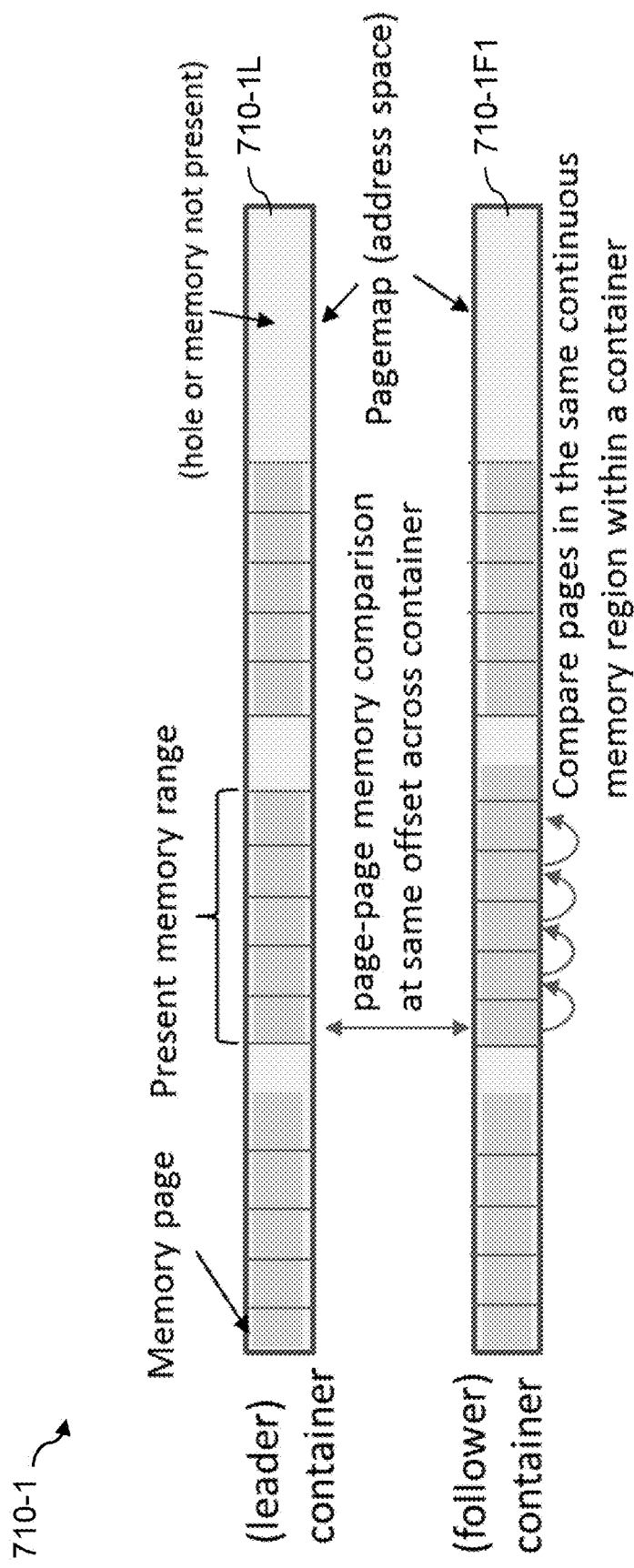
FIG. 7 shows page-to-page comparison of a leader container to a follower container for purposes of deduplication in group-based container checkpoint generation in an illustrative embodiment.

FIG. 7 shows a container group 710-1 comprising a leader container 710-1L and a follower container 710-1F1. A host device in this embodiment performs a page-to-page comparison of portions of leader container 710-1L to corresponding portions of follower container 710-1F1 for purposes of deduplication in group-based container checkpoint generation, in the manner illustrated in the figure.

In this embodiment, the page-to-page comparison more particularly comprises generating a first hash of at least a portion of a given page of the leader container 710-1L, generating a second hash of at least a portion of a corresponding page of the follower container 710-1F1, comparing the first and second hashes, and identifying the page as a shared page responsive to a match between the first and second hashes. This page-to-page comparison is repeated for other pages of the same continuous memory region with each container. The address space of the containers may include portions or "holes" that do not currently store any data, possibly due to non-present or swapped-out pages. The arrangement of FIG. 7 performs a quick memory deduplication check for page-aligned portions at the same offset across the leader and follower containers, using a sampling-based hash digest approach.

The hashes can be generated using a hash function such as Super Fast Hashing applied to initial portions of each page, such as initial 64-byte portions of each page. If the resulting hashes match exactly, the host device may assume that the two pages have the same content, or may implement further bitwise comparison to confirm its initial determination. The hashes are considered metadata and therefore can remain only in host device memory and need not be dumped to persistent storage. Other types of hash functions such as Secure Hashing Algorithm 1 (SHA1) can be used to generate the hashes for purposes of detecting pages shared by the leader container 710-1L and the follower container 710-1F1. Additional follower containers can each be compared to the leader container 710-1L in a similar manner to identify one or more pages that are shared by those containers.

The present memory pages for each container can be determined, for example, by reading the relevant files in /proc. In some embodiments, the page-to-page comparison starts from the same offset, but may have different range lengths specified in terms of different numbers of pages. In such an arrangement, the page-to-page comparison continues until the final page of the shorter range is reached.

Other types of deduplication techniques may be applied to detect pages shared between containers of a container group in other embodiments. For example, instead of comparing just the leader container to each follower container, which would have a time cost on the order of N−1 for a container group having N containers, all possible pairs of containers of the container group may be compared, which would have a much higher time cost of N*(N−1)/2. Intermediate arrangements can also be used, with the particular comparison arrangement used in a given instantiation being configurable by a system user.

Figure 8:
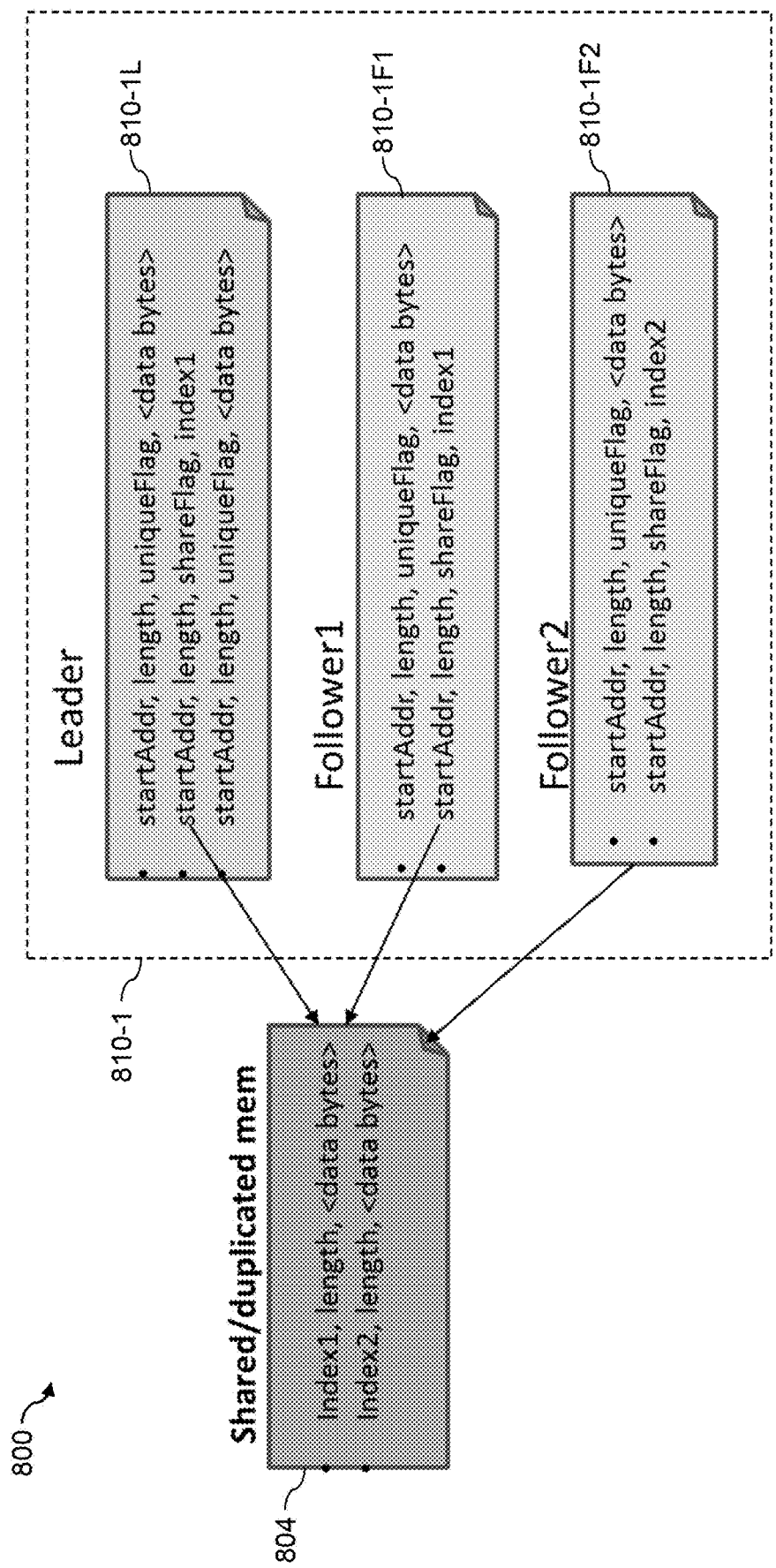
FIG. 8 illustrates an example description of leader and follower containers of a container group with reference to portions of a shared memory.

FIG. 8 shows a portion of an information processing system 800 comprising a container group 810-1 having a leader container 810-1L and multiple follower containers 810-1F1 and 810-1F2. The figure illustrates an index-based data structure 804 that is used to characterize shared and/or duplicated portions of the leader container 810-1L. These portions illustratively include shared pages that are part of the leader container 810-1L and one or more of the follower containers 810-1F1 and 810-1F2. Different portions of the containers of the container group 810-1 are designated as shared portions by a shareFlag, and other portions are designated as unique portions by a uniqueFlag.

The shared portions of the containers of the container group 810-1 are each characterized by a starting address, a length, the shareFlag, and an index number that references a particular one of the index entries of the index-based data structure 804. Each such index entry includes the index number, a length and a corresponding set of data bytes denoted as <data bytes>.

The unique portions of the containers of the container group 810-1 are each characterized by a starting address, a length, the shareFlag and corresponding set of data bytes denoted as <data bytes>.

The index-based data structure 804 and other informational elements utilized to characterize the container group 810-1 in the system 800 can be used to facilitate the dumping of pages of the leader and follower containers to persistent storage in a manner that avoids duplication of shared pages.

The deduplication functionality of the host device can incorporate detection and tracking of changes in the memory using one or more memory dirty bits. Detection of changes can trigger a reset of the deduplication.

The FIG. 8 embodiment is an example of an arrangement in which the host device identifies shared pages between leader and follower containers of a container group by utilizing a shared memory data structure that includes a plurality of different sets of shared data bytes each having an index identifier and a length. A given one of the containers that shares the data bytes of a particular one of the sets of data bytes with another one of the containers is characterized by a data structure that includes a starting address, a length, a share flag and a corresponding one of the index identifiers. Numerous other data structures can be used to efficiently represent shared pages between leader and follower containers in conjunction with generation of group-based container checkpoints.

As mentioned previously, functionality for group-based container checkpointing can be integrated into a PaaS platform such as Cloud Foundry or Virtustream. Other types of information processing systems in which group-based container checkpointing can be implemented in illustrative embodiments include hyper-converged systems such as Cyclone, as well as enterprise data centers.

In some embodiments, functionality for group-based container checkpointing is integrated with existing system functionality. For example, the disclosed techniques can be integrated with existing container management technologies such as SWARM and Kubernetes.

In addition, the disclosed functionality for group-based container checkpointing can be utilized with a wide variety of different types of storage systems, including storage systems comprising ScaleIO™ software-defined storage and/or Isilon® platform nodes, both from Dell EMC. For example, a given multi-tier storage system referred to herein can include a fast tier implemented at least in part using ScaleIO™ software-defined storage and a capacity tier implemented at least in part utilizing a scale-out NAS cluster comprising Isilon® platform nodes. Both ScaleIO™ and Isilon® support Docker volume plug-ins using REX-Ray. Numerous other storage systems can be used in other embodiments.

Accordingly, illustrative embodiments can be implemented at least in part utilizing an extended engine plugin configured to support functionality for group-based container checkpointing as disclosed herein. Such an extended engine plugin can be configured to operate in conjunction with existing COW infrastructure such as a Docker engine backed by COW DeviceMapper and AUFS storage drivers. Other snapshot frameworks can be used in other embodiments.

Functionality for group-based container checkpointing such as that described above in conjunction with illustrative embodiments can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be noted that the particular arrangements illustrated in FIGS. 1 through 8 are presented by way of illustrative example only, and should not be construed as limiting in any way. As noted above, the described functionality for group-based container checkpointing can be implemented using additional or alternative components. Accordingly, a wide variety of different group-based container checkpointing arrangements can be used in other embodiments.

The illustrative embodiments described above provide significant advantages over conventional arrangements.

For example, some embodiments implement techniques for efficient checkpointing of containers using designated container groups.

These and other embodiments can provide substantially more efficient generation of checkpoints for containers in a host device than would otherwise be possible using conventional techniques such as the above-noted generation of checkpoints for individual containers on a per-container basis.

The group-based container checkpointing can be readily deployed in a shared processing environment within cloud infrastructure, such as within a container-based PaaS cloud, as well as in numerous other information processing system environments.

The group-based container checkpointing in some embodiments is implemented in the form of an add-on module that leverages existing interfaces and associated memory management infrastructure of a host device.

Illustrative embodiments can provide significantly improved system performance in a wide variety of different container host device contexts, such as maintenance, upgrade, scale-out and migration.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as host devices and their corresponding programs, or portions thereof, are illustratively implemented for use by respective tenants of such a multi-tenant environment.

As mentioned previously, cloud infrastructure as disclosed herein can include cloud-based systems such as AWS, GCP and Microsoft Azure. Virtual machines provided in such systems can be used to implement containers that are grouped based on layer structures and possibly other parameters for purposes of container management and data services in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
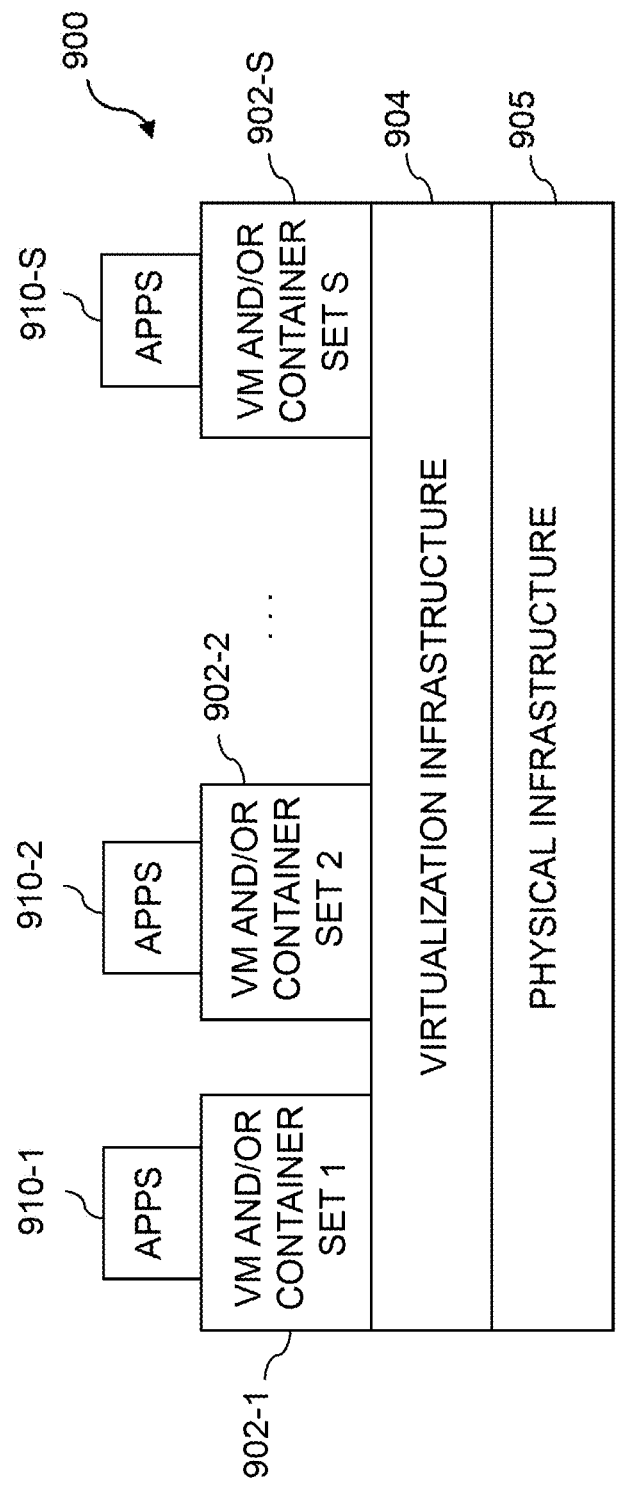

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-S implemented using virtualization infrastructure 904. The virtualization infrastructure 904 runs on physical infrastructure 905, and illustratively comprises one or more hypervisors and/or operating system level virtualization infrastructure. The cloud infrastructure 900 further comprises sets of applications 910-1, 910-2, . . . 910-S running on respective ones of the VMs/container sets 902-1, 902-2, . . . 902-S under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide group-based container checkpointing of the type described above for multiple processes running on a given one of the VMs. For example, each of the VMs can implement checkpoint control logic similar to checkpoint control logic 116 of host device 102-1 for providing group-based container checkpointing functionality for multiple containers running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. Such implementations can be configured to provide group-based container checkpointing of the type described above for multiple containers. For example, a container host device supporting multiple containers of one or more container sets can be configured to implement checkpoint control logic similar to checkpoint control logic 116 of host device 102-1 for providing group-based container checkpointing functionality for the multiple containers.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure from VCE, the Virtual Computing Environment Company, now the Converged Platform and Solutions Division of Dell EMC.

These and numerous other alternative cloud computing environments can be configured to implement functionality for group-based container checkpointing as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the group-based container checkpointing functionality disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, containers, container groups, shared memories, memory management units, checkpoint control logic, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a host device comprising at least one processor and an associated memory;
the host device being configured to implement a plurality of containers each configured to access one or more portions of the memory;
the containers being implemented as respective kernel control groups utilizing operating system level virtualization of the processor of the host device;
the host device being further configured:
to assign the containers to groups in accordance with one or more designated criteria; and
to generate checkpoints for respective groups of the containers;
wherein in conjunction with generation of a given one of the checkpoints for a particular one of the groups of containers, the host device is further configured to identify one or more pages of the memory that are shared by at least first and second containers of the particular group of containers, and to generate the given checkpoint without duplicating the one or more shared pages to persistent storage.

2. The apparatus of claim 1 wherein the host device is further configured to restore the particular group of containers from the given checkpoint.

3. The apparatus of claim 1 wherein one of the containers of the particular group is designated as a leader container and one or more other containers of the particular group are each designated as a follower container.

4. The apparatus of claim 3 wherein the container designated as the leader container for the particular group comprises the container that utilizes the largest portion of the memory relative to all of the containers of the particular group and further wherein all other containers of the particular group are designated as respective follower containers.

5. The apparatus of claim 3 wherein in conjunction with generation of the given checkpoint, pages of at least one memory range of the leader container are compared with pages of a corresponding memory range of each of one or more follower containers to identify the one or more shared pages.

6. The apparatus of claim 3 wherein the host device is further configured to generate the given checkpoint for the particular group of containers by:
dumping all pages of the leader container to the persistent storage; and
dumping pages of the follower containers less any pages shared with the leader container to the persistent storage.

7. The apparatus of claim 3 wherein the host device is further configured to restore the particular group of containers from the given checkpoint by:
restoring the leader container from the given checkpoint; and
responsive to restoration of the leader container from the given checkpoint, restoring the one or more follower containers from the given checkpoint.

8. The apparatus of claim 1 wherein generating the given checkpoint comprises generating the given checkpoint as a checkpoint file to be stored in the persistent storage wherein the checkpoint file comprises:
a shared memory portion comprising the one or more shared pages; and
one or more unique memory portions each comprising one or more pages unique to a corresponding one of the containers of the particular group.

9. The apparatus of claim 1 wherein the host device is further configured to maintain a deduplication lookup table for the particular group and to utilize the deduplication lookup table to ensure that the shared pages are not duplicated to the persistent storage in conjunction with the generation of the checkpoint for that group.

10. The apparatus of claim 1 wherein the one or more designated criteria utilized to assign containers to groups comprise at least one of:
a first rule specifying that containers created from the same container image are assigned to the same group;
a second rule specifying that containers allocated to a given user are assigned to the same group; and
a third rule comprising a combination of at least the first and second rules in accordance with a particular logic function.

11. The apparatus of claim 1 wherein the host device is further configured to generate the checkpoints for respective ones of the groups of containers at least in part in parallel with one another.

12. The apparatus of claim 1 wherein the host device is further configured to identify the shared pages by performing page-to-page comparison between respective pages of the respective first and second containers starting at a specified offset within the containers.

13. The apparatus of claim 12 wherein the page-to-page comparison comprises:
generating a first hash of at least a portion of a given page of the first container;
generating a second hash of at least a portion of a corresponding page of the second container;
comparing the first and second hashes; and
identifying the page as a shared page responsive to a match between the first and second hashes.

14. The apparatus of claim 1 wherein the host device is further configured to identify the shared pages utilizing a shared memory data structure that comprises a plurality of different sets of shared data bytes each having an index identifier and a length, and wherein a given one of the containers that shares the data bytes of a particular one of the sets of data bytes with another one of the containers is characterized by a data structure that includes a starting address, a length, a share flag and a corresponding one of the index identifiers.

15. A method comprising:
configuring a host device comprising at least one processor and an associated memory to implement a plurality of containers each configured to access one or more portions of the memory;
the containers being implemented as respective kernel control groups utilizing operating system level virtualization of the processor of the host device;
the method further comprising the following steps performed by the host device:
assigning the containers to groups in accordance with one or more designated criteria; and
generating checkpoints for respective groups of the containers;
wherein in conjunction with generation of a given one of the checkpoints for a particular one of the groups of containers, the host device is further configured to identify one or more pages of the memory that are shared by at least first and second containers of the particular group of containers, and to generate the given checkpoint without duplicating the one or more shared pages to persistent storage.

16. The method of claim 15 wherein one of the containers of the particular group is designated as a leader container and one or more other containers of the particular group are each designated as a follower container.

17. The method of claim 16 wherein generating the given checkpoint for the particular group of containers comprises:
dumping all pages of the leader container to the persistent storage; and
dumping pages of the follower containers less any pages shared with the leader container to the persistent storage.

18. A computer program product comprising a non-transitory processor-readable storage medium having stored therein program code of one or more software programs, wherein the program code when executed by a host device comprising at least one processor and an associated memory causes the host device:
to implement a plurality of containers each configured to access one or more portions of the memory;
the containers being implemented as respective kernel control groups utilizing operating system level virtualization of the processor of the host device;
to assign the containers to groups in accordance with one or more designated criteria; and
to generate checkpoints for respective groups of the containers;
wherein in conjunction with generation of a given one of the checkpoints for a particular one of the groups of containers, the host device is further configured to identify one or more pages of the memory that are shared by at least first and second containers of the particular group of containers, and to generate the given checkpoint without duplicating the one or more shared pages to persistent storage.

19. The computer program product of claim 18 wherein one of the containers of the particular group is designated as a leader container and one or more other containers of the particular group are each designated as a follower container.

20. The computer program product of claim 19 wherein generating the given checkpoint for the particular group of containers comprises:
dumping all pages of the leader container to the persistent storage; and
dumping pages of the follower containers less any pages shared with the leader container to the persistent storage.

* * * * *